Sept. 29, 1953   F. J. MOORE ET AL   2,653,959
PROCESS FOR RECOVERING OXYGENATED ORGANIC COMPOUNDS
Filed March 22, 1949
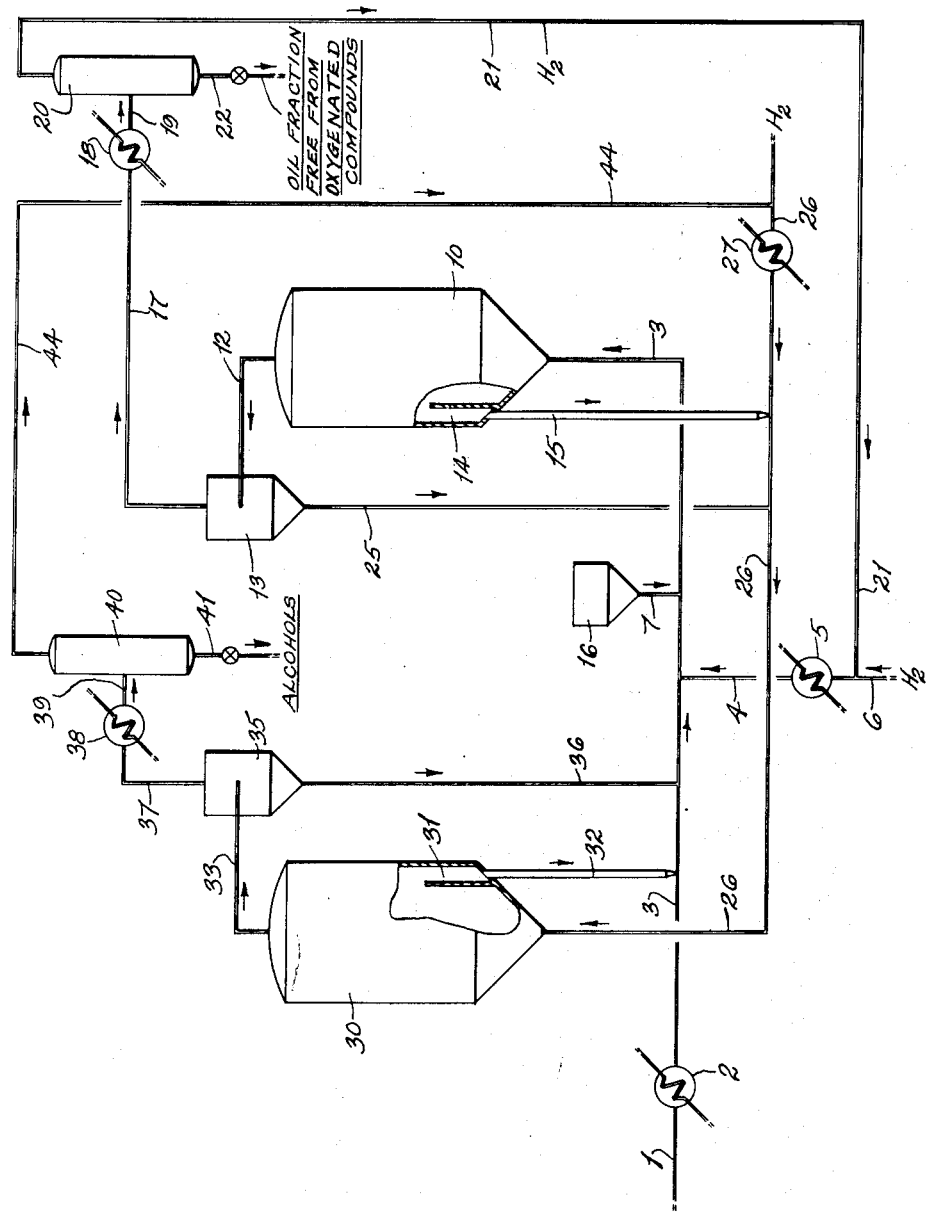
INVENTORS
FRANK J. MOORE
HOWARD V. HESS
BY
ATTORNEYS

UNITED STATES PATENT OFFICE 2,653,959

PROCESS FOR RECOVERING OXYGENATED ORGANIC COMPOUNDS

Frank J. Moore and Howard V. Hess, Beacon, N. Y., assignors to The Texas Company, New York, N. Y., a corporation of Delaware Application March 22, 1949, Serial No. 82,806

9 Claims. (Cl. 260—450)

This invention relates to a process for treating the oil phase of the product obtained by the catalytic conversion of synthesis gas. More specifically, the invention provides a process for separating oxygen-containing compounds from the oil phase of the product obtained in the conversion of synthesis gas to synthetic fuel.

The catalytic conversion of carbon monoxide and hydrogen into synthetic fuel by contact with a fluidized iron catalyst at an elevated temperature of 500 to 750° F. and at a pressure of 100 to 500 pounds per square inch results in the formation of a product comprising a gas phase and a liquid phase, the latter consisting of approximately one part oil phase and two parts water phase. Oxygen-containing organic compounds such as alcohol, esters, acids, ketones and aldehydes are distributed through the two-phase liquid product; the molecular weight of the oxygen-containing compounds determines whether they are primarily found in the water phase or the oil phase. The oxygen-containing compounds found in the oil phase comprise high molecular weight oxygen-containing compounds such as $C_4$ and higher alcohols, esters containing more than 3 carbon atoms, $C_3$ and higher organic acids with traces of lower molecular weight compounds. Since oxygen-containing organic compounds found in the oil phase are valuable chemicals in their own right, and particularly since their presence is undesirable in the use of the oil phase as gasoline or diesel fuel, it is advisable to recover oxygen-containing organic compounds from the hydrocarbon phase. The subject invention provides a method whereby oxygen-containing organic compounds are separated from the oil phase in the form of valuable high molecular weight alcohols which are useful as intermediates in the preparation of plasticizers and synthetic detergents.

In accordance with this invention, the oil phase of a synthesis product is vaporized and passed into an adsorption zone wherein it contacts a particulate fluent solid comprising an adsorbent for oxygen-containing organic compounds. Oxygen-containing organic compounds are adsorbed on the particulate fluent solid and an effluent comprising oil phase substantially free of oxygen-containing compounds issues from the adsorption zone. The particulate solid is continuously separated from the vaporized oil phase and is introduced into a hydrogenation-desorption zone wherein it is maintained in a fluent state by passage of hydrogen therethrough. The hydrogenation-desorption zone contains a hydrogenation catalyst. The hot hydrogen gas desorbs oxygen-containing organic compounds from the particulate fluent solid in the desorption zone and concomitantly hydrogenates the aldehyde, ester, ketone and acid fractions of the oxygen-containing organic compounds to alcohols. The desorbed and hydrogenated oxygen-containing organic compounds substantially in the form of alcohols are separated from the particulate fluent solid whose adsorption power has been restored by the high temperature hydrogen treatment; the separated solid is reintroduced into the adsorption zone in order to act as an adsorbent for further quantities of oxygen-containing organic compounds from the vaporized oil phase of synthetic fuel.

In the preferred modification of the invention, adsorbent and hydrogenating catalyst are combined in a particulate fluent solid composite which is continuously recycled through the adsorption and desorption zones. This solid composite has a dual function; in the adsorption zone, oxygen-containing organic compounds are adsorbed from the vaporized oil phase on the adsorbent portion of the composite; in the hydrogenation-desorption zone reduction of aldehyde, ketone, ester and acid components is effected by the hydrogen employed as a desorbing gas in the presence of the hydrogenating catalyst portion of the composite. Moreover, the adsorbent portion of the composite acts as a carrier for the hydrogenating catalyst. Ordinarily, the composite contains approximately 50 to 99 per cent adsorbent and 1 to 50 per cent hydrogenating catalyst such as nickel or copper chromite.

The addition of a small amount of super-heated steam to hydrogen aids in desorption of oxygen-containing organic compounds from the adsorbent in the hydrogenation-desorption zone. The incorporation of steam in the hydrogen stream also has an advantageous effect on the regeneration of the adsorbent which occurs simultaneously. A hydrogen stream containing 1 to 10 per cent steam is advantageously employed in the hydrogenation-desorption zone.

It is also possible to effect hydrogenation and desorption in separate zones. In such a modification, hydrogenation of non-alcoholic oxygen-containing organic compounds to alcohols is effected in a secondary zone following the adsorption zone and thereafter desorption of alcohols from the adsorbent is effected in a tertiary zone by means of steam. This modification allows the use of elevated pressures in the secondary zone for hydrogenating aldehydes, ketones, esters and acids to alcohols.

The process of the subject invention is particularly useful in the treatment of the gas oil fraction of synthesis product. It is difficult to separate oxygen-containing organic compounds from the gas oil fraction because of the similar solubility characteristics of the high molecular weight oxygen-containing compounds and the gas oil hydrocarbons in which they are dissolved. The hydrocol product is advantageously partitioned into gasoline and gas oil fractions which are separately treated in accordance with the process of this invention.

When it is stated that the particulate solid which is either adsorbent or composite comprising adsorbent plus hydrogenation catalyst is maintained in a fluent state in both the adsorption and hydrogenation-desorption zones, it is meant that it is kept in a state of continuous motion as distinguished from a stationary fixed bed. A fluidized fixed bed of particulate solid, wherein the particles form a pseudo-liquid level, is included within the scope of fluent state. Suspension type contacting wherein the particulate solid is substantially entrained in the gas stream passing through the adsorption and hydrogenation-desorption zones is also regarded as a modification of fluent operation. An operation, wherein a mass of particulate adsorbent moves downwardly through both adsorption and hydrogenation-desorption zones countercurrently to the upflowing vaporized oil phase and hydrogen, is also a fluent operation. All of these modifications of fluent operation can be employed in the process of this invention with the necessary modifications required to adapt each to continuous operation.

Silica gel is the preferred adsorbent, but other adsorbents such as activated carbon, zeolite, activated clay and activated alumina may also be employed as the adsorbent in the process of this invention.

A large number of hydrogenating catalysts can be employed to effect conversion of aldehydes, ketones, esters and acids to alcohols. Preferred hydrogenating agents are metals such as nickel, cobalt, copper, platinum and palladium. Oxides and sulfides such as molybdenum sulfide, molybdenum oxide, nickel sulfide and chromium or mixtures of such oxides and sulfides may also be used as hydrogenating agents. Low-pressure hydrogenation of aldehydes, ketones, esters and acids to alcohols is improved by the incorporation of small amounts of the oxides or carbonates of calcium and magnesium in the hydrogenation catalyst. Advantageously, the aforementioned hydrogenating agents are supported on suitable carriers such as silica gel, alumina, etc. The preferred modification of the invention wherein a composite adsorbent-hydrogenating catalyst is recycled between the adsorption and hydrogenation-desorption zones is particularly advantageous because the incorporation of a hydrogenating agent of the type previously described on a carrier such as silica gel forms a particularly active hydrogenation catalyst.

In the preferred modification, the composite comprises 50 to 99 per cent adsorbent and 1 to 50 per cent hydrogenation agent. Examples of such composites are copper chromite on silica gel, nickel on silica gel, molybdenum sulfide on alumina. The preferred composition of the composite is approximately 3 to 15 per cent hydrogenation agent and 85 to 97 per cent adsorbent. A mixture which is an excellent composite comprises 5 per cent nickel and 95 per cent silica gel.

It is advantageous to employ a gaseous diluent to aid in the fluidization of the particulate solid in the adsorption zone and to help maintain the oil phase in the vapor state during passage therethrough. The maintenance of the gas oil fraction of synthesis product in the vapor state during passage through the adsorption zone is substantially facilitated by the use of a gaseous diluent. Gaseous hydrocarbons such as methane and ethane, nitrogen, hydrogen and combustion gases, are diluents that may be employed for this purpose.

Many advantages result from employing the process of this invention for separating oxygen-containing organic compounds from the hydrocarbon phase of synthesis product. The process of this invention affords a means of recovering oxygen-containing organic compounds from the hydrocarbon phase of liquid products in the form of alcohols for which there is a large demand as intermediates in the preparation of plasticizers and synthetic detergents.

The conversion of aldehydes, esters, acids and ketones to alcohols facilitates the isolation of relatively pure compounds after the oxygen-containing organic compounds have been separated from the hydrocarbon phase. The present invention eliminates a complex recovery procedure by converting substantially all of the oxygen-containing organic compounds to alcohols.

A third advantage resides in the fact that simultaneous desorption and regeneration of adsorbent is effected in the hydrogenation-desorption zone by contact of the adsorbent with hydrogen under conditions required for hydrogenating the oxygen-containing organic compounds to alcohols. Substantial economies are realized by concomitantly effecting desorption and regeneration of the adsorbent.

The adsorption zone is maintained at a temperature between 200 and 700° F. The identity of the adsorbent and the boiling point range of the synthesis fraction to be treated determine the temperature at which the adsorption zone is maintained. Silica gel, the preferred adsorbent, allows the maintenance of temperature as high as 600 to 700° F. in the adsorption zone. It is advisable to use more moderate temperatures in the adsorption zone with adsorbents such as alumina, activated carbon etc.

Pressure in the adsorption zone may range from sub-atmospheric to a pressure of approximately 20 atmospheres. It is preferred to employ atmospheric pressures since higher pressures militate against the maintenance of the oil phase in the vapor state. Higher pressures necessitate the use of greater quantities of gaseous diluents in order to maintain the oil phase in the vapor state.

In the hydrogenation-desorption zone, temperatures are ordinarily maintained between 300 and 800° F. Hydrogenation of aldehydes, ketones, esters and acids to alcohols proceeds well in this range with temperatures of 400 to 700° F. being preferred. It is recommended that temperature in the hydrogenation-desorption zone be maintained at least 200° F. and preferably 300 or 400° F. above the boiling points of the adsorbed alcohols, aldehydes, acids, esters and ketones, when employing hydrogen alone in the hydrogenation - desorption zone. In order to effect simultaneous desorption and regeneration with a non-polar gas such as hydrogen, it is necessary to observe the aforementioned temperature requirements. However, the incorporation of a small percentage of superheated steam in the hydrogen permits simultaneous desorption and regeneration without observing the requirement of a temperature at least 200° F. above the boiling point of the adsorbed alcohols. The use of steam together with the hydrogen is helpful in keeping the temperature in the hydrogenation-desorption zone between 300 and 800° F.

Pressures between sub-atmospheric and 500 pounds per square inch are ordinarily employed in the desorption zone. Higher pressures favor the hydrogenation step and hinder the desorption step. Accordingly, sub-atmospheric pressure and atmospheric pressure are generally employed in the desorption zone.

The particle size of the adsorbent or of the composite adsorbent-hydrogenation catalyst varies with the type of fluent operation, adsorbent density and vapor velocity that are employed. Particle size of adsorbent for any particular operation is determined by the vapor velocity to be used. For example, in a fluid bed type operation, with a vapor velocity of about one foot per second, particle size should be maintained between 50 and 150 mesh.

In order that the invention may be more fully understood, reference will now be made to the accompanying figure wherein there is diagrammatically presented a preferred modification of subject invention in which a composite comprising adsorbent and hydrogenation catalyst is maintained in a fluidized bed in both adsorption and hydrogenation zones.

The process of the invention will be explained in connection with the treatment of a gas oil fraction of synthesis product having a boiling point range of approximately 350 to 600° F. Hydrogen or hydrogen-rich gas is employed in the adsorption zone to aid in the maintenance of the adsorbent in the fluent state and of the gas oil in the vapor phase.

Gas oil fraction obtained by the catalytic conversion of synthesis gas by contact with a fluidized iron catalyst at a temperature of about 650° F. and at a pressure of about 250 pounds per square inch is introduced through a conduit 1 into a heater 2 wherein it is raised to a temperature of about 600° F. This gas oil fraction has a boiling point of about 350 to 650° F. and contains approximately 4 per cent alcohols and 7 per cent esters and acids as indicated by a hydroxyl number of 14 and a saponification number of 23.1. There are also small quantities of aldehydes and ketones present in this gas oil fraction. After vaporized gas oil fraction leaves the heater 2 through a conduit 3, it is mixed with an equal volume of hydrogen which, after having been raised to a temperature of approximately 650° F. in a heater 5, is introduced into the conduit 3 by means of a pipe 4; hydrogen is obtained from a source not shown through a pipe 6. The mixture of vaporized gas oil fraction and hydrogen passes along the conduit 3 and is introduced into an adsorption zone 10. Provision is made for the introduction of fresh nickel-silica gel continuously into conduit 3; fresh adsorbent-hydrogenation composite comprising nickel-silica gel is stored in a hopper 16 and flows into the conduit through a standpipe 7.

The composite adsorbent-hydrogenation catalyst comprises approximately 5 per cent nickel and 95 per cent silica gel. The composite may be prepared by co-precipitation or impregnation; in this instance it is prepared by soaking silica gel in nickel nitrate solution after which the silica gel is calcined.

In the adsorption zone 10, the mixture of gas oil fraction and hydrogen contacts composite solid at a temperature of about 650° F. and at atmospheric pressure. The composite is maintained in the form of a fluidized bed by the passage of the vaporized gas oil fraction and hydrogen therethrough.

Alcohols, acids, ketones, aldehydes and esters dissolved in the gas oil fraction are substantially adsorbed on the fluidized composite under the aforedescribed conditions.

Particle size of composite and vapor velocity at which the gaseous mixture is passed through the adsorption zone 10 are correlated so that there is a small continuous carry-over of adsorbent entrained in the adsorption zone effluent. With a fluidized bed operation and 50 to 150 mesh nickel-silica gel composite, vapor velocities of about one foot per second are ordinarily employed. An effluent comprising vaporized gas oil fraction, hydrogen and nickel-silica gel composite containing adsorbed oxygen-containing compounds issues from the adsorption zone 10 through a pipe 12. This gaseous effluent passes into separating means 13 such as a cyclone separator adapted for the separation of entrained solid particles from a gaseous stream.

The adsorption zone 10 also contains a settling zone 14 and a standpipe 15 through which nickel-silica gel composite is withdrawn from the adsorption zone 10.

The gaseous effluent from which entrained composite has been separated issues from the separating means 13 through a pipe 17 and is cooled to atmospheric conditions in a heat exchanger 18. Thereafter, it passes through a pipe 19 into a stabilizer 20 wherein condensed gas oil is separated from the gaseous diluent.

Hydrogen leaves the stabilizer 20 through a pipe 21 and is recycled therethrough to the heater 5 wherein it is raised to a temperature of about 650° F. prior to its combination with vaporized gas oil fraction rich in oxygen-containing organic compounds.

Gas oil fraction substantially free from oxygen-containing compounds and with improved cetane rating issues from the stabilizer 20 through a pipe 22. Gas oil fraction treated in this fashion has a hydroxyl number of approximately 2, indicating about an 0.5 weight per cent alcohol content, and a saponification number of approximately 5.3 indicating an acid plus ester content of about 1.4 weight per cent. This gas oil fraction can be recycled to the adsorption zone 10 if it is deemed advisable to effect a more complete removal of oxygenated compounds therefrom. However, the quality of the gas oil fraction as a diesel fuel is substantially improved and a high recovery of valuable oxygen-containing compounds is realized by once-through operation.

Solid composite which has been separated in the separating means 13 and in the settling zone 14, flows through pipes 25, and 15, respectively, into a conduit 26 through which there flows the hydrogen employed for hydrogenation of the oxygen-containing organic compounds to alcohols. Hydrogen is ordinarily preheated to a temperature of approximately 500 to 700° F. in a preheater 27. The composite solid is carried along the conduit 26 by the hot hydrogen and introduced into the hydrogenation-desorption zone 30.

In the hydrogenation-desorption zone 30 oxygen-containing organic compounds are hydrogenated to alcohols and are desorbed from the composite. Moreover, the composite has its adsorption power restored by the contact with the hydrogen stream at elevated temperature so that the composite can be directly reintroduced into the adsorption zone 10 after removal from the hydrogenation-desorption zone 30.

A settling zone 31 in the hydrogenation-desorption zone 30 serves as a means for separating fluidized nickel-silica gel from the hydrogen. A standpipe 32 connects the settling zone 31 with conduit 3 through which vaporized gas oil fraction is introduced into the adsorption zone 10. Nickel-silica gel whose adsorption power has been restored is returned to adsorption zone 10 entrained in the vaporized gas oil fraction.

Separating means such as cyclone separator 35 is provided for removal of entrained nickel-silica gel from the effluent leaving the hydrogenation-desorption zone 30 through pipe 33. The effluent comprises hydrogen, alcohols and entrained nickel-silica gel. The nickel-silica gel separated from the effluent in the cyclone 35 flows through a stand-pipe 36 into the aforementioned conduit 3.

Hydrogen and alcohols leave the cyclone 35 through a pipe 37 and are introduced into a heat exchanger 38 wherein they are cooled to atmospheric temperature. The alcohols are condensed by such cooling and are separated from hydrogen in the separator 40 to which they are introduced through pipe 39. Alcohols are withdrawn from the separator 40 through a draw-off pipe 41. The alcohols can be separated into individual components by fractionation.

Recovery of the oxygen-containing compounds from gas oil fraction in the form of alcohols eliminates further purification steps such as alkali washing, etc., which is required when the oxygen-containing organic compounds are recovered as a heterogeneous mixture of alcohols, aldehydes, acids, esters and ketones.

Hydrogen, which is separated from alcohols in the separator 40, is recycled through the pipe 44 to the hydrogenation-desorption zone 30. The pipe 44 connects with the conduit 26 through which hydrogen and solid composite saturated with oxygen-containing organic compounds are introduced into the hydrogenation-desorption zone 30.

The foregoing description is concerned with a preferred modification of the process of the subject invention. As has been indicated previously, various modifications of the invention can be employed. For example, the adsorption may be carried out by passing the vaporized oil phase of synthesis product in contact with a fluidized or a suspended adsorbent material in finely divided form within an adsorption tower. A stream of adsorbent particles containing adsorbed oxygen-containing compounds is drawn off from the adsorption tower and suspended in a stream of hydrogen and the resulting suspension is passed through a mass of hydrogenating catalyst particles maintained within a separate tower. The hydrogenating catalyst mass may be in the form of a fixed bed of relatively coarse catalyst particles or a fluidized bed of relatively dense particles so that the suspension of fine or relatively less dense adsorbent particles in hydrogen flows through the hydrogenating tower without entrainment or without substantial entrainment of hydrogenating catalyst particles. The oxygen-containing compounds are desorbed from the adsorbent particles by the hot hydrogen gas and are hydrogenated to alcohols as they pass through the mass of hydrogenation catalyst. The suspended adsorption particles are separated from the effluent stream of alcohols leaving the hydrogenation tower, the separated adsorbent particles being recirculated to the adsorbent tower.

Two or more hydrogenating towers may be employed in this type of operation so that when the hydrogenating catalylst becomes spent in one tower the reactant stream can be switched to an adjacent tower to permit reactivation of the catalyst in the off stream tower.

It is contemplated that the hydrogenating catalyst may be employed in the form of a downflowing moving bed of particles relatively denser than the particles of adsorbent rising therethrough as a suspension in the stream of hydrogen gas and vaporized oxygen-containing compounds. In this way hydrogenation catalyst can be drawn off in a continuous stream for reactivation and subsequent return to the hydrogenation tower.

Alternatively, the adsorbent may be employed in the relatively coarse or more dense form while the hydrogenating catalyst is employed in the relatively fine or less dense particle form.

The incorporation of steam in the hydrogen employed in the hydrogenation-desorption zone is a particularly advantageous modification of the invention. Moreover, the use of a 3-zone system wherein hydrogenation of non-alcoholic oxygen-containing organic compounds to alcohols is effected in a secondary zone at elevated pressure and desorption effected in a tertiary zone is also an attractive alternative modification.

Obviously, many modifications and variations of the invention, as hereinbefore set forth, may be made without departing from the spirit and scope thereof, and therefore only such limitations should be imposed as are indicated in the appended claims.

We claim:

1. A process for separating normally liquid oxygen-containing organic compounds mainly in the form of alcohols from the oil phase of synthesis product which comprises vaporizing said oil phase containing alcohols, aldehydes, esters, ketones and acids, contacting said vaporized oil phase in an adsorption zone at a temperature between 200 and 700° F. with a particulate fluent solid composite comprising an adsorbent and a hydrogenation agent whereby oxygen-containing organic compounds are adsorbed on said solid composite, separating said solid composite containing oxygen-containing organic compounds from vaporized oil phase, introducing said solid composite into a hydrogenation-desorption zone, maintaining said solid composite in a fluent state in said hydrogenation-desorption zone, passing hydrogen through said hydrogenation-desorption zone at a temperature between 300 and 800° F., hydrogenating said aldehydes, acids, esters and ketones to alcohols and desorbing oxygen-containing compounds from said solid composite in said hydrogenation-desorption zone, separating said solid composite from hydrogen and oxygen-containing compounds comprising mainly alcohols, recycling said separated solid composite to said adsorption zone and recovering said oxygen-containing compounds mainly in the form of alcohols.

2. A process according to claim 1 in which silica gel is employed as an adsorbent in the solid composite.

3. A process according to claim 1 in which solid composite is nickel-silica gel comprising 5 to 15 per cent nickel and 85 to 95 per cent silica gel.

4. A process according to claim 1 in which solid composite is maintained in the form of fluidized bed in both adsorption and hydrogenation-desorption zones.

5. A process for separating normally liquid oxygen-containing organic compounds mainly in the form of alcohols from the oil phase of synthesis product which comprises vaporizing said oil phase, contacting said vaporized oil phase containing alcohols, aldehydes, esters, ketones and acids in an adsorption zone at a temperature of 200 to 700° F., with a particulate fluent solid composite comprising an adsorbent and a hydrogenation agent whereby oxygen-containing organic compounds are adsorbed on said solid composite, separating said solid composite containing oxygen-containing organic compounds from vaporized oil phase, introducing said solid composite into a hydrogenation-desorption zone, maintaining said solid composite in a fluent state in said hydrogenation-desorption zone, passing a gas comprising hydrogen and steam through said hydrogenation-desorption zone at a temperature of 300 to 800° F., hydrogenating said aldehydes, acids, esters and ketones to alcohols and desorbing said oxygen-containing organic compounds from said solid composite in said hydrogenation-desorption zone, separating said solid composite from hydrogen, steam and oxygen-containing compounds comprising mainly alcohols, recyling said separated solid composite to said adsorption zone and recovering said oxygen-containing compounds mainly in the form of alcohols.

6. A process according to claim 5 in which the gas passed through said hydrogenation-desorption zone comprises 1 to 15 per cent steam and 85 to 99 per cent hydrogen.

7. A process for separating normally liquid oxygen-containing organic compounds mainly in the form of alcohols from the oil phase of synthesis product which comprises fractionating said oil phase containing alcohols, aldehydes, acids, esters and ketones into a gasoline fraction and a gas oil fraction, vaporizing said gas oil fraction, contacting said vaporized gas oil fraction in the presence of hydrogen in an adsorption zone at a temperature of 200 to 700° F. with a fluent particulate composite comprising an adsorbent and a hydrogenation agent whereby oxygen-containing organic compounds are adsorbed on said solid composite and the olefinic constituents of said gas oil phase are hydrogenated, separating said composite containing oxygen-containing organic compounds from said vaporized gas oil fraction, introducing said composite into a hydrogenation-desorption zone, maintaining said composite in a fluent state in said hydrogenation-desorption zone, passing a gas comprising hydrogen and steam through said hydrogenation-desorption zone at a temperature of 500 to 700° F., hydrogenating aldehydes, esters, acids and ketones to alcohols and desorbing said oxygenates from said composite in said hydrogenation-desorption zone, separating said solid composite from hydrogen, steam and oxygenates comprising mainly alcohols, recycling said composite to said adsorption zone and recovering said oxygenates mainly in the form of alcohols.

8. A process according to claim 7 in which the gas passing through the hydrogenation-desorption zone comprises 1 to 15 per cent steam and 85 to 99 per cent hydrogen.

9. A process according to claim 7 in which said solid composite comprises 5 to 15 per cent nickel and 85 to 90 per cent silica gel.

FRANK J. MOORE.
HOWARD V. HESS.

References Cited in the file of this patent

UNITED STATES PATENTS

| Number | Name | Date |
| --- | --- | --- |
| 1,577,534 | Miller | Mar. 23, 1926 |
| 1,684,640 | Schmidt et al. | Sept. 18, 1938 |
| 2,154,676 | Haeuber et al. | Apr. 18, 1939 |
| 2,171,324 | Zetzsche et al. | Aug. 29, 1939 |
| 2,410,642 | Farkas et al. | Nov. 5, 1946 |
| 2,425,535 | Hibshman | Aug. 12, 1947 |
| 2,449,402 | Lipkin et al. | Sept. 14, 1948 |
| 2,529,624 | Murray | Nov. 14, 1950 |

OTHER REFERENCES

Gyani et al.: Studies on Adsorption in Relation to Constitution," 49 Journal of Physical Chemistry 226 (Sept 25, 1946).